(12) United States Patent
Lin (10) Patent No.: US 7,810,613 B2
(45) Date of Patent: Oct. 12, 2010

(54) CART BRAKING DEVICE

(76) Inventor: Ching-Sung Lin, No. 22-2, Lane 143, Tan-Hsin Street, Shu-Ling City, Taipei Hsien (TW)

( * ) Notice: Subject to any disclaimer, the term of this patent is extended or adjusted under 35 U.S.C. 154(b) by 564 days.

(21) Appl. No.: 11/947,768

(22) Filed: Nov. 29, 2007

(65) Prior Publication Data

US 2009/0139804 A1    Jun. 4, 2009

(51) Int. Cl.
     *B60B 33/00*      (2006.01)
(52) U.S. Cl. .................. 188/1.12; 188/31; 188/60; 188/69; 188/265; 16/35 R
(58) Field of Classification Search ............... 188/1.12, 188/31, 60, 69, 265, 29, 57; 16/18 R, 35 R, 16/35 D
See application file for complete search history.

(56) References Cited

U.S. PATENT DOCUMENTS

| | | | | | |
|---|---|---|---|---|---|
| 3,911,525 | A | * | 10/1975 | Haussels | 16/35 R |
| 3,988,800 | A | * | 11/1976 | Sachser | 16/35 R |
| 4,722,114 | A | * | 2/1988 | Neumann | 16/35 R |
| 4,815,161 | A | * | 3/1989 | Timmer et al. | 16/35 R |
| 5,303,450 | A | * | 4/1994 | Lange | 16/35 D |
| 5,774,936 | A | * | 7/1998 | Vetter | 16/35 R |
| 6,298,950 | B1 | * | 10/2001 | Oelrichs et al. | 188/20 |
| 6,336,524 | B1 | * | 1/2002 | Van Loon et al. | 188/1.12 |
| 6,584,641 | B1 | * | 7/2003 | Milbredt | 16/35 R |
| 6,834,746 | B1 | * | 12/2004 | Lin | 188/1.12 |
| 6,865,775 | B2 | * | 3/2005 | Ganance | 16/35 R |
| 7,496,745 | B1 | * | 2/2009 | Lok et al. | 713/2 |
| 7,614,115 | B2 | * | 11/2009 | Yan | 16/35 R |

\* cited by examiner

*Primary Examiner*—Robert A Siconolfi
*Assistant Examiner*—Mariano Sy (57) ABSTRACT

A cart braking device includes a swivel unit, a shaft unit and a braking unit which has a central shaft, an orientation member, a braking member and a base. The central shaft is coupled with the orientation member and has an elastic piece for moving the central shaft upward. A bottom of the orientation member has an orientation gear and a top of the braking member has a fixation gear corresponding to the orientation gear. The braking member is disposed in the base and includes two braking pads. An elastic member is disposed between the base and the braking member, and can move the braking member away from the base. When the braking pads are pressed against the wheel, the cart braking device stops the rotation of the wheel. When the orientation gear is engaged with the fixation gear, the cart braking device prevents the wheel from changing direction.

8 Claims, 9 Drawing Sheets

CART BRAKING DEVICE

BACKGROUND OF THE INVENTION

1. Field of the Invention

The present invention relates to a cart braking device, and in particular to a cart braking device has functions of wheel braking and directional locking.

2. The Prior Arts

A cart is used to carry merchandise, goods, luggage, etc. to provide laborsaving and convenient transportation. In order to prevent the cart from rolling when unattended by the user, a cart braking device is developed to eliminate the hazard caused by free-wheeling cart.

A conventional cart braking device has various types, such as a handle type handbrake, a pedal type footbrake, etc. The conventional cart braking device usually uses a brake pad to directly press against a tread surface of a wheel, thereby stopping the movement thereof.

Figure 1:
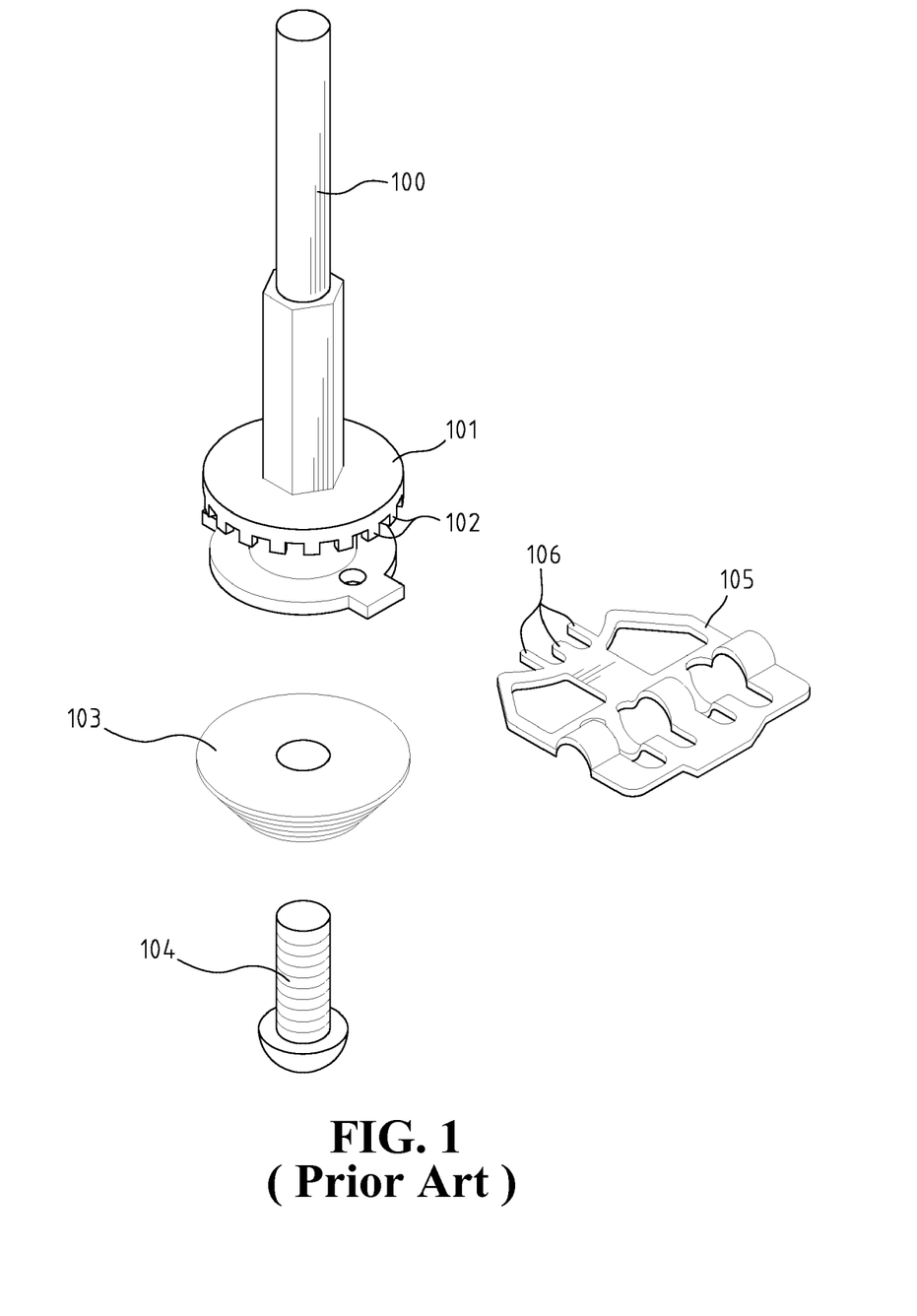
FIG. 1 is an exploded view showing a conventional cart braking device.
Figure 2:
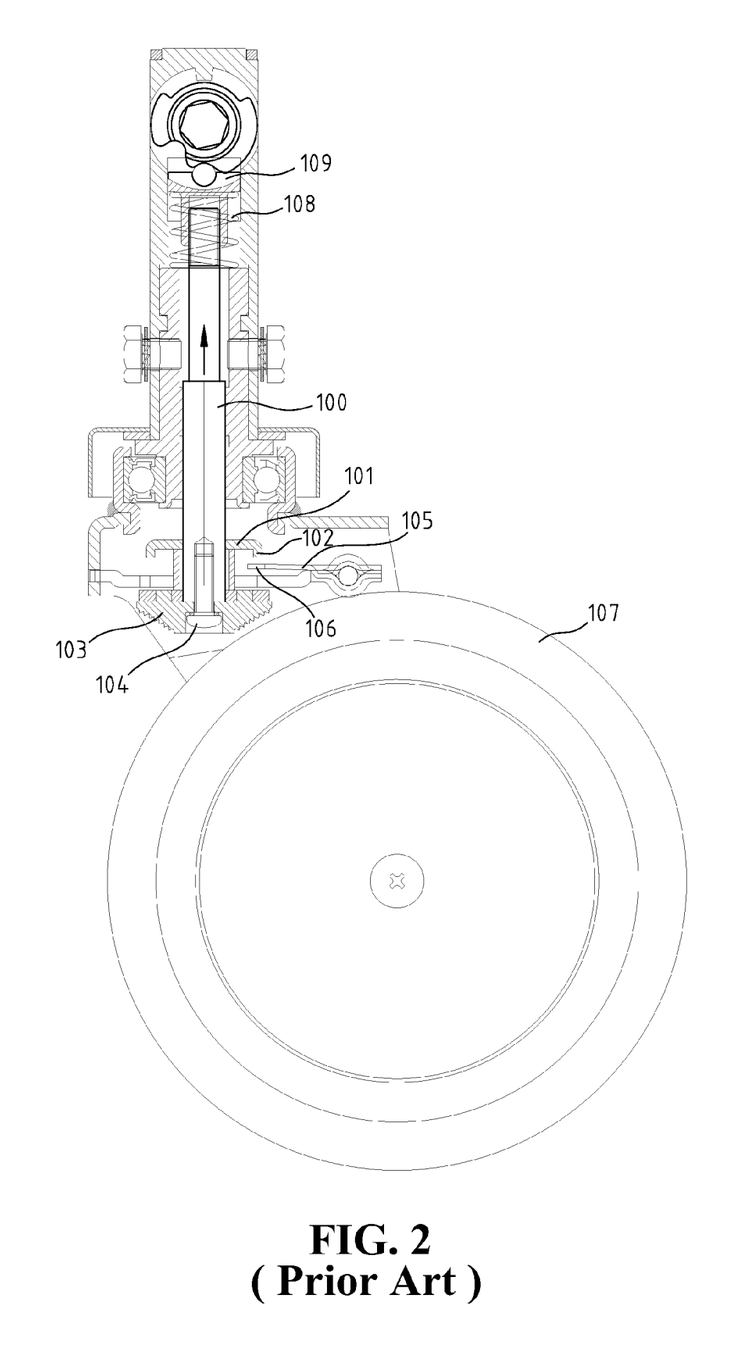
FIG. 2 is a cross sectional view showing a wheel and the conventional cart braking device in a rotation un-braking and direction un-locking state.
Figure 3:
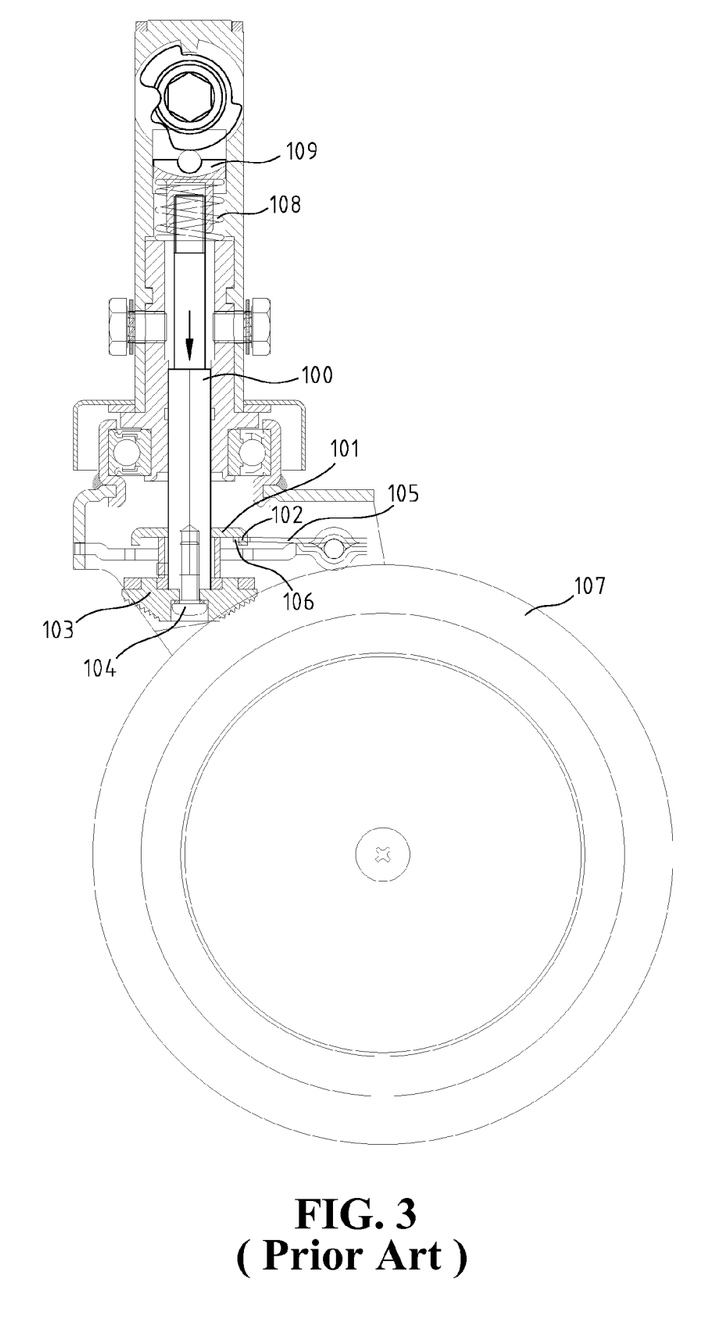
FIG. 3 is a cross sectional view showing the wheel and the conventional cart braking device in a rotation braking and direction locking state.

Referring to FIGS. 1-3, a conventional cart braking device includes a central shaft 100, an orientation piece 101, a braking pad 103, a screw 104, and an fixation piece 105. The screw 104 connects the braking pad 103 to a lower end of the shaft 100. The orientation piece 101 having a plurality of teeth 102 is mounted on the shaft 100. The elastic fixation piece 105 is disposed by the central shaft 100 and is provided with at least one projected arm 106. A spring 108 is sleeved on the central shaft 100 and a cap 109 is mounted on a top of the central shaft 100. Referring to FIG. 3, when the central shaft 100 is pushed downward, the braking pad 103 is moved downward and pressed against a tread surface of a caster wheel 107. Thus, the wheel 107 is fixed and kept stationary. Moreover, the teeth 102 of the orientation piece 101 are engaged with the projected arms 106, so the central shaft 100 can not be rotated and the wheel 107 can not be rotated about the central shaft 100, thereby locking the direction of the wheel. Therefore, the cart braking device has functions of wheel braking and directional locking. Referring to FIG. 2, the compressed spring 108 returns to its original state after the pressing force is released from the central shaft 100. Elastic force of the spring 108 is applied on the cap 109, and therefore the central shaft 100 is moved upward with the cap 109. The braking pad 103 is moved upward with the central shaft 100 and is separated from the wheel 107. A distance is kept between the braking pad 103 and the tire surface of the wheel 107. The orientation piece 101 is disengaged from the fixation piece 105. Thus the wheel 107 can freely be rotated about an axis of the wheel 107 and about the central shaft 100.

Although the conventional cart braking device has the functions of wheel braking and directional locking, it still has the following disadvantages.

(1) The braking pad 103 is pressed against the tread surface of the wheel 107. After a period of time, the tread surface worn out. The braking pad 103 can no longer fully contact with the tread surface of the wheel 107, so the braking is not functioning well. Then, it needs to replaces the wheel 107.

(2) When the cart moves, the tread surface is contacted with the floor at a circumferential center line of the wheel 107. The braking pad 103 is directly pressed on the circumferential center line of the wheel 107. Repeated use of the cart braking device wears the wheel 107 and causes uneven wear on the tread surface at the circumferential center line of the wheel 107. The uneven tread surface results in cart bumping on the floor and collision of objects in the cart, when the cart moves. The disadvantage is serious, especially when the cart is used to transport very ill patient or precision instruments. It makes the patient uncomfortable and damages the precision instruments.

(3) When the projected arms 106 of the fixation piece 105 are engaged with the teeth 102 of orientation piece 101, end portions of the teeth 102 are in contact with sides of the projected arms 106. The end portions of the teeth 102 of the orientation piece 101 are rectangular and a pitch of the teeth 102 is large. Although elasticity of the orientation piece 101 can help the projected arms 106 to be engaged with the teeth 102, it has to rotate the orientation piece 101 at certain angles to engage the teeth 102 with the projected arms 106. Thus, the engagement of the teeth 102 and the projected arms 106 is intermittent but not continuous.

SUMMARY OF THE INVENTION

A primary objective of the present invention is to provide a cart braking device that overcomes the disadvantages of the conventional design mentioned above.

A cart braking device according to the present invention includes a central shaft, an orientation member, a braking member and a base. The central shaft is couple with the orientation member and includes an elastic piece to provide an elastic force to move the central shaft upward. The orientation member includes an orientation gear at a bottom thereof. A top surface of the braking member comprises a fixation gear corresponding to the orientation gear. The braking member includes two braking pads at a bottom thereof. The braking pads have curved surfaces whose curvatures are corresponding to those of shoulders of a wheel. The shoulders of the wheel are on a tread surface and respectively located at both sides of a circumferential center line of the wheel. The braking member is mounted on the base and braking pads are projected out of the base. An elastic member is disposed between the braking member and the base to push the braking member away from the base. When the wheel rotates, the braking pads under the braking member keep a distance away from the wheel. Thus, the wheel can rotates freely. At the same time, the orientation member is away from the braking member, so the base and the wheel can freely rotate about the central shaft to change direction. When braking the cart, the central shaft is pushed downward. The orientation gear of the orientation member is pushed down to be engaged with the fixation gear of the braking member, thereby preventing the base and the wheel from rotating about the central shaft. The base and the wheel can not rotate to change direction. Then, the braking member is pushed downward and the curved surfaces of the braking pads are in full contact with shoulders of the wheel, thereby preventing the wheel from rotating. The wheel is stopped and the cart can not move. Therefore, the cart braking device according to the present invention has the functions of wheel braking and directional locking.

The cart braking device according to the present invention uses the curved surfaces of the braking pads to press against the shoulders of the wheel, which stops the rotation of the wheel and brakes the cart. After repeated use, the braking pads do not cause uneven wear on the circumferential center line of the tread surface, which is in contact with the floor, so the cart braking device according to the present invention effectively solves the problem of cart bumping on the floor. The cart having the cart braking device is suitable to transport precision instruments and very ill patients, which reduces instrument damages and provides comfortable ride for the patients during the transportation.

The curved surfaces of the braking pads can still effectively press against the shoulders of the wheel without loss of braking, even after the tread surface of the wheel around the circumferential center line shows signs of wear. Thus, it does not need to frequently replace the wheels and the cart braking device lowers the expenditure cost.

The orientation gear is push down to be engaged with the fixation gear of the braking member, when braking the cart. Thus, the orientation of the wheel is locked and the cart moves in a fixed direction. Moreover, the cart braking device according to the present invention can fix the orientation of the wheel at any angle.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE PREFERRED EMBODIMENT

Figure 4:
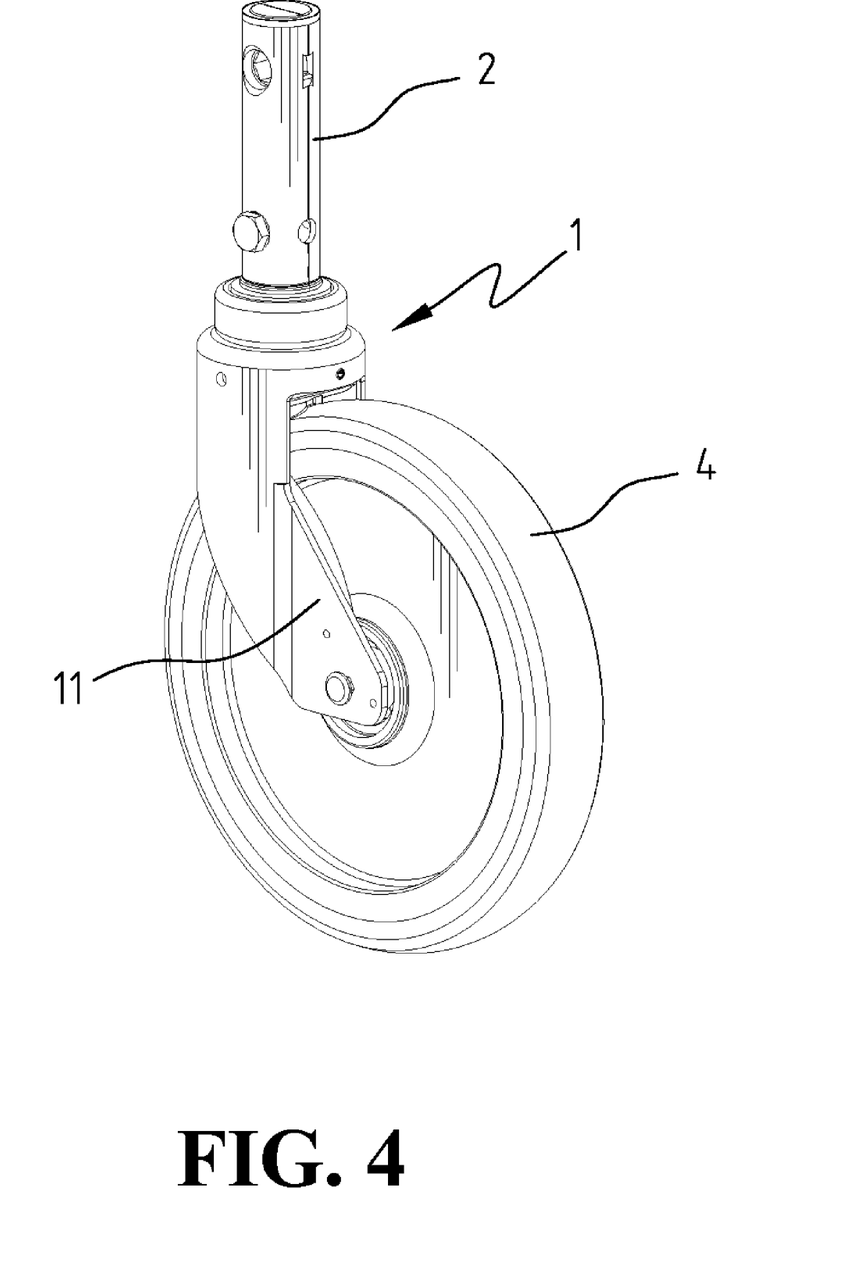
FIG. 4 is a perspective view showing a wheel and a cart braking device according to the present invention.
Figure 5:
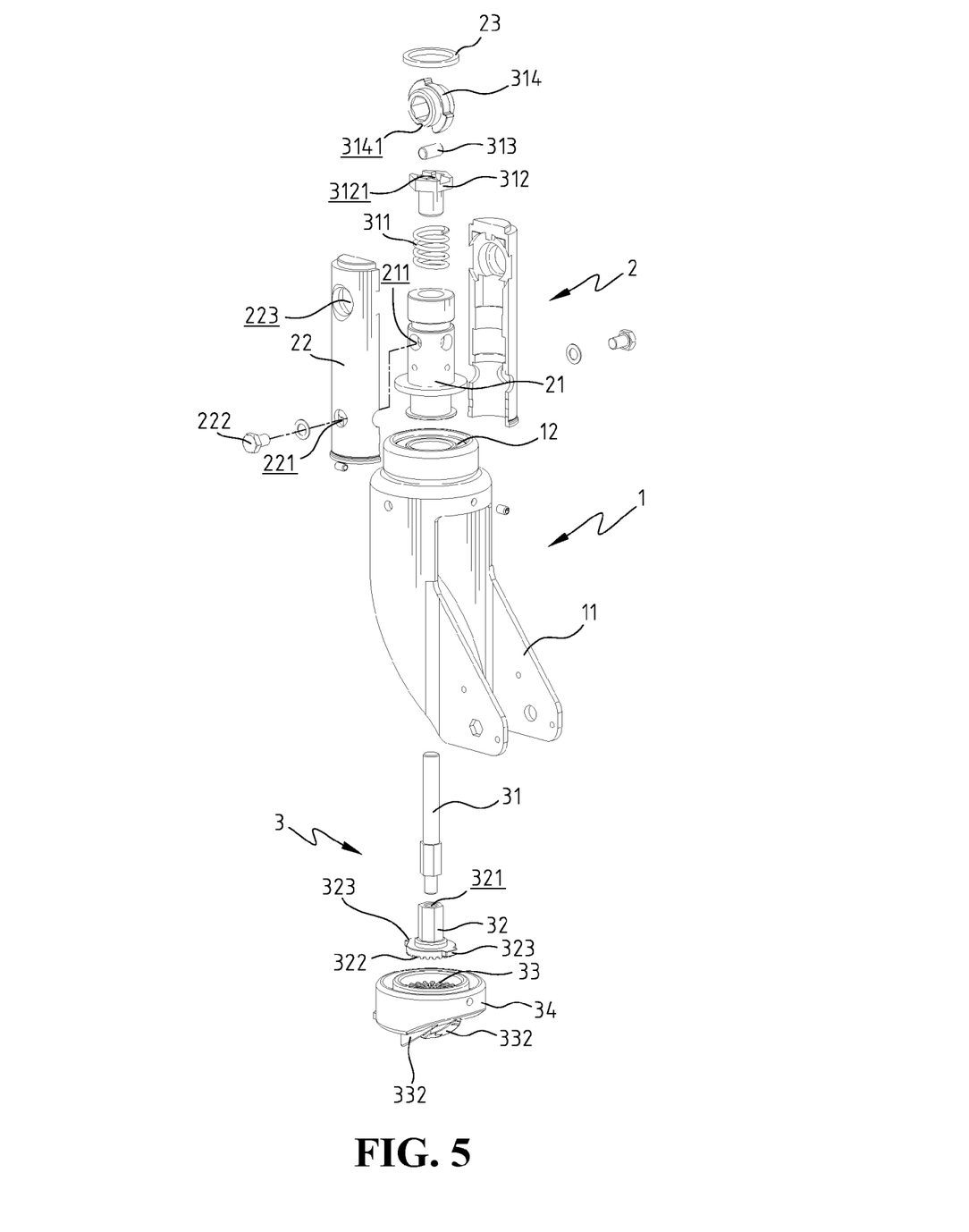
FIG. 5 is an exploded view showing the cart braking device according to the present invention.
Figure 6:
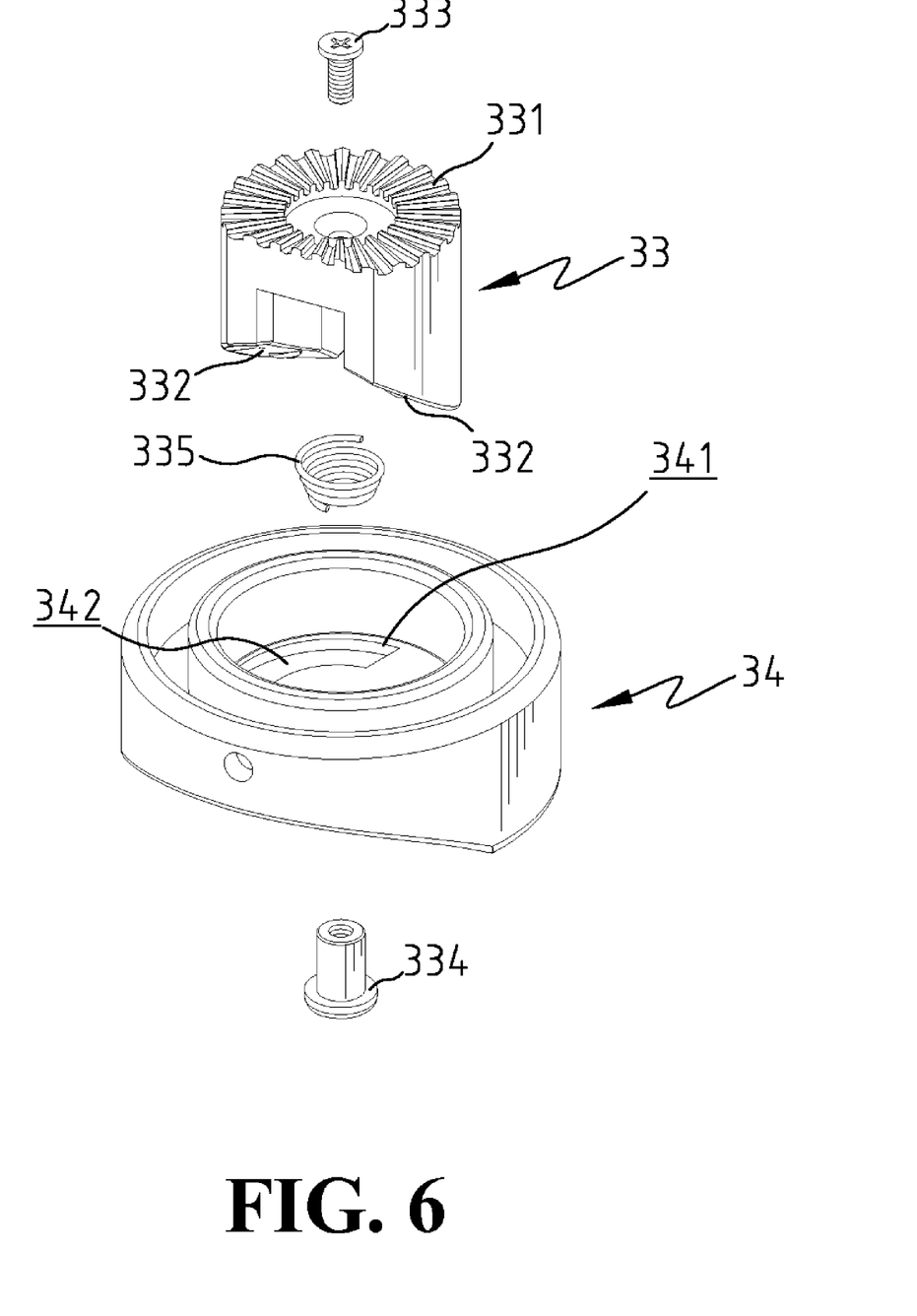
FIG. 6 is an exploded view showing a braking member and a base of the cart braking device according to the present invention.

Referring to FIGS. 4-6, the cart braking device according to the presentation includes a swivel unit 1, a shaft unit 2 and a braking unit 3.

Referring to FIG. 4, the swivel unit 1 includes a wheel frame 11 pivotally connected with a wheel 4. The shaft unit 2 is mounted at a top of the swivel unit 1, and a bearing 12 is disposed between the swivel unit 1 and the shaft unit 2. Because of the bearing 12, the swivel unit 1 can rotate relative to shaft unit 2. Referring to FIGS. 5, 7, 8 and 9, the swivel unit 1 includes at least one orientation opening 13 disposed under the bearing 12. The orientation opening 13 is located in the direct front or rear of the swivel unit 1.

The shaft unit 2 includes a hollow shaft 21 and two shaft covers 22. The hollow shaft 21 includes two assembling holes 211 at a side wall thereof. A lower end of the hollow shaft 21 is fitted in the bearing 12. Each shaft cover 22 includes an assembling hole 221 and a through hole 223. A screw 222 passes through each assembling hole 221 of the shaft cover 22 and the corresponding assembling hole 211 of the hollow shaft 21 to fasten the hollow shaft 21 and the shaft cover 22 together. A ring 23 is sleeved on upper ends of the shaft covers 22 to securely connect the two shaft covers 22 together.

The braking unit 3 is disposed in the swivel unit 1 and the shaft unit 2. The braking unit 3 includes a central shaft 31, an orientation member 32, a braking member 33, and a base 34.

The central shaft 31 is coupled with the orientation member 32. The central shaft 31 passes through the hollow shaft 21 of the shaft unit 2 and an elastic piece 311. A cap 312 is mounted on a top of the central shaft 31. Upper and lower ends of the elastic piece 311 are pressed against the cap 312 and the hollow shaft 21, respectively. When the elastic piece 311 is in an uncompressed state, elastic force of the elastic piece 311 pushes the cap 312 upward, thereby bringing the central shaft 31 and the orientation member 32 upward.

Referring to FIG. 5, the orientation member 32 has an assembling hole 321 at an upper portion thereof, and an orientation gear 322 and at least one orientation lug 323 at a bottom surface thereof. The shape of the orientation lug 323 is corresponding to that of the orientation opening 13. The central shaft 31 is fitted into the assembling hole 321. An outer surface of the orientation member 32 is polygonal, whose shape is corresponding to that of lower inner portion of the hollow shaft 21. The orientation member 32 is loosely fitted into the lower portion of the hollow shaft 21. Therefore, the orientation member 32, the central shaft 31 and the hollow shaft 21 rotate simultaneously. The orientation member 32 and the central shaft 31 are inside the hollow shaft 21, and can move in axial direction.

Referring to FIG. 6, a top of the braking member 33 includes a fixation gear 331 corresponding to the orientation gear 322 of the orientation member 32. The orientation gear 322 and the fixation gear 331 are crown gears. A lower portion of the braking member 33 includes two braking pads 332 having curved surfaces whose curvatures are corresponding to those of shoulders of the wheel 4. In order to provide a high level of traction, the curved surface of the braking pad is a rough surface or has ridges, raised dots, grooves, recessed dots, etc. The braking member 33 is axially assembled inside the base 34 by screws 333, 334. Moreover, the braking pads 332 are projected out of a lower portion of the base 34. An elastic member 335 is disposed between the braking member 33 and the base 34. When the elastic member 335 is in an uncompressed state, elastic force of the elastic member 335 pushes the braking member 33 away from the base 34.

The base 34 includes a receiving recession 341 at an inner portion thereof. The receiving recession 341 includes two pad through-holes 342 at a side thereof. The receiving recession 341 receives and connects with the braking member 33. The pad through-holes 342 of the receiving recession 341 allow the braking pads to pass through. The base 34 is mounted inside of the swivel unit 1.

Referring to FIG. 5, the cap 312 mounted on the top of the central shaft 31 includes a curved groove 3121. A horizontal rolling rod 313 is movingly engaged in the curved groove 3121. A rotating disc 314 is disposed above the rolling rod 313. The rotating disc 314 includes a first groove 3141 and a second groove 3142 at a circumferential surface thereof. The depth of the first groove 3141 is deeper than that of the second groove 3142. The rotating disc 314 has two lugs fitted in the through holes 223 of the shaft cover 22. When a force is applied, the rotating disc 314 is rotated about a central axis of the through holes 223.

Figure 7:
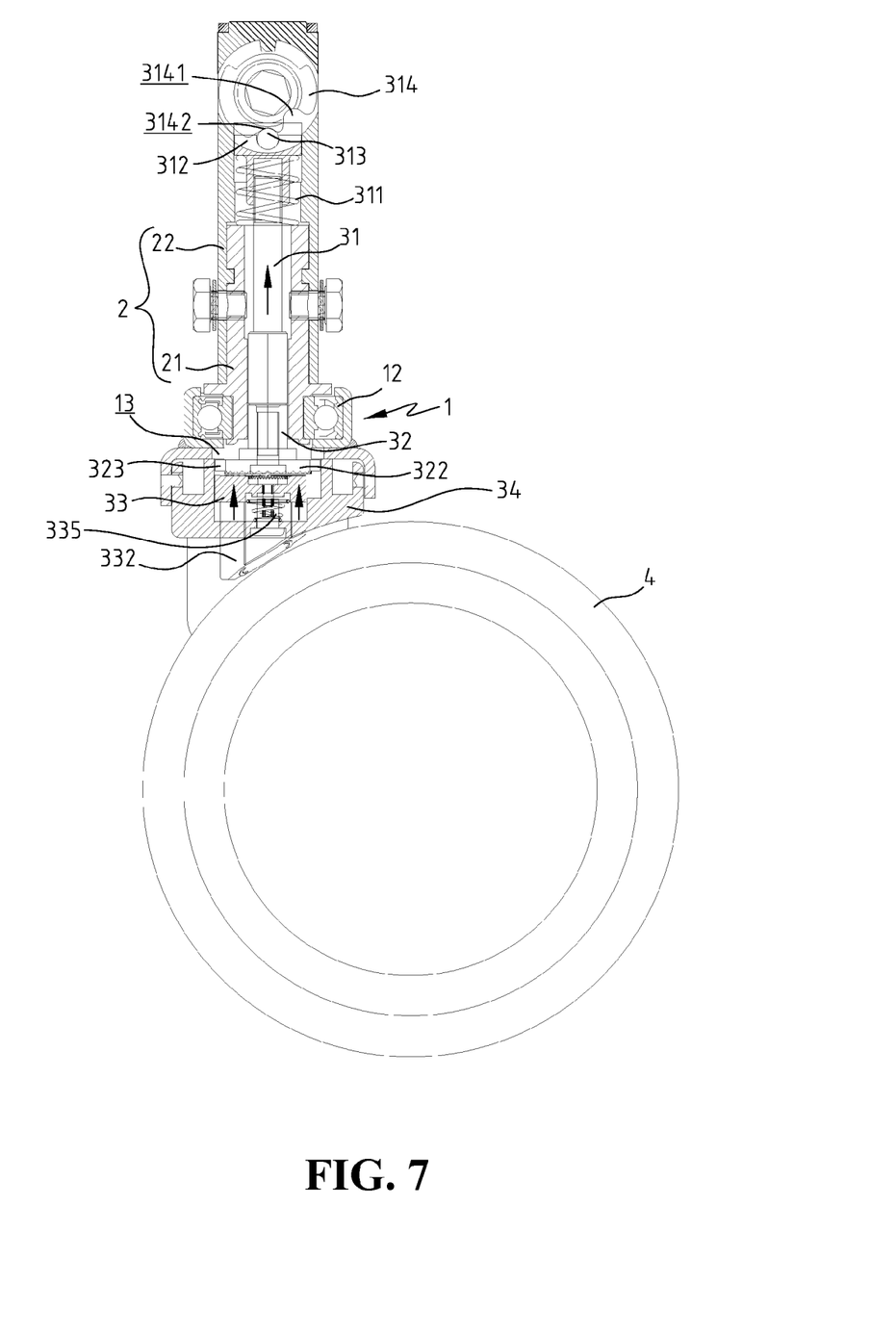
FIG. 7 is a cross sectional view showing the wheel and the cart braking device according to the present invention in a rotation un-braking and direction unlocking state.

Referring to FIG. 7, the rolling rod 313 is disposed in the second groove 3142 of the rotating disc 314. When there is no force pressing down against the cap 312 and the central shaft 31, elastic force of the elastic piece 311 pushes the cap 312 upward. Then, the central shaft 31 pulls the orientation member 32 upward. Thus, the orientation gear 322 of the orientation member 32 is separated from the fixation gear 331 of the braking member 33. The braking member 33 and the base 34 of the braking unit 3 can be rotated with the swivel unit 1 and the wheel 4. Thus, the wheel 4 can change the direction. The elastic member 335 pushes the braking member 33 upward to be separated from the base 34. The braking pads 332 of the braking member 33 keep a distance away from the wheel 4, and therefore the wheel 4 are free to rotate.

Figure 8:
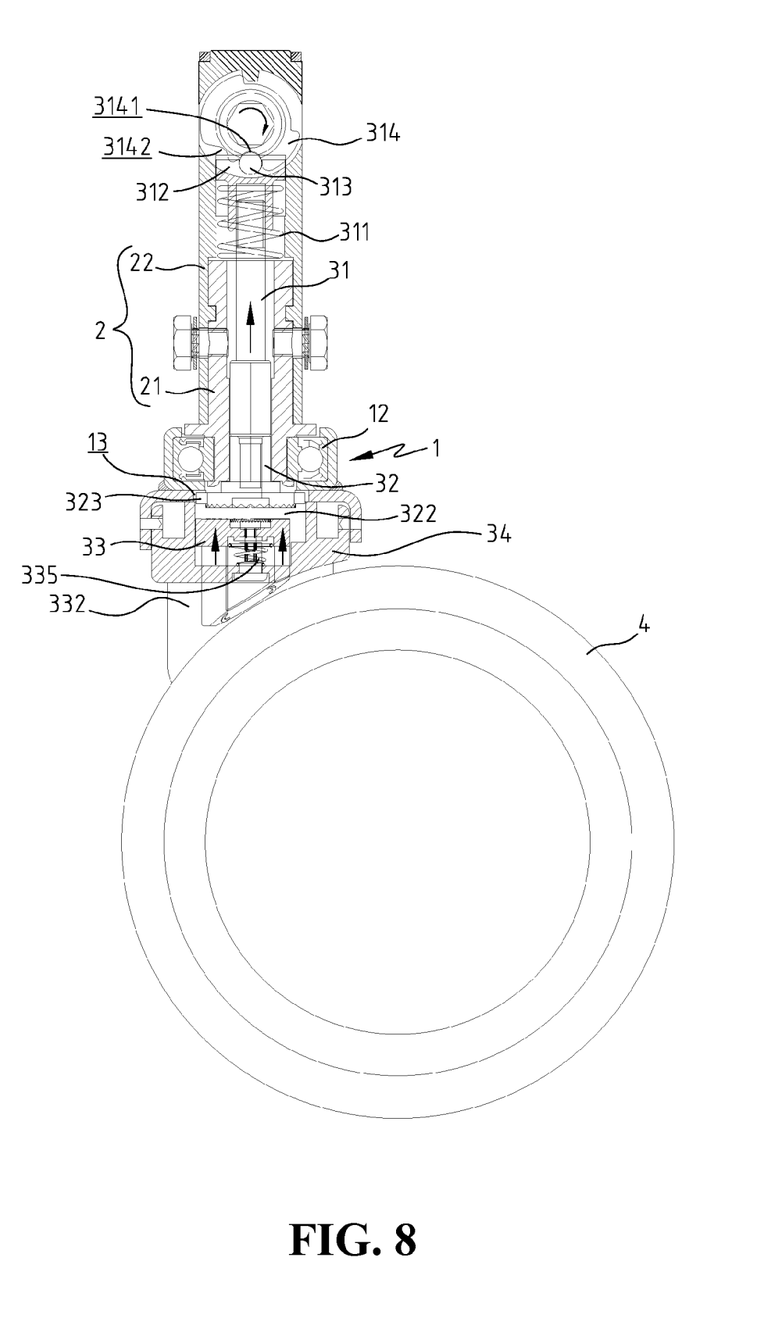
FIG. 8 is a cross sectional view showing the wheel and the cart braking device according to the present invention in a rotation un-braking and direction locking state.

Referring to FIG. 8, the rotating disc 314 is rotated clockwise, thereby engaging the rolling rod 313 in the first groove 3141 of the rotating disc 314. Because the first groove 3141 is deeper than the second groove 3142, elastic force of the elastic piece 311 further pushes the cap 312 upward. Then, the central shaft 31 further pulls the orientation member 32 upward. When the swivel unit 1 and the wheel 4 are rotated to the direct front direction, the orientation lug 323 of the orientation member 32 is moved upward and engaged in the orientation opening 13. Thus, the direction of wheel 4 is locked; the cart can only go straight ahead. The elastic member 335 still pushes the braking member 33 upward to be separated from the base 34. The braking pads 332 of the braking member 33 keep a distance away from the wheel 4. Therefore, the wheel 4 is free to rotate but is kept in direct front direction. The cart can only go straight ahead.

Figure 9:
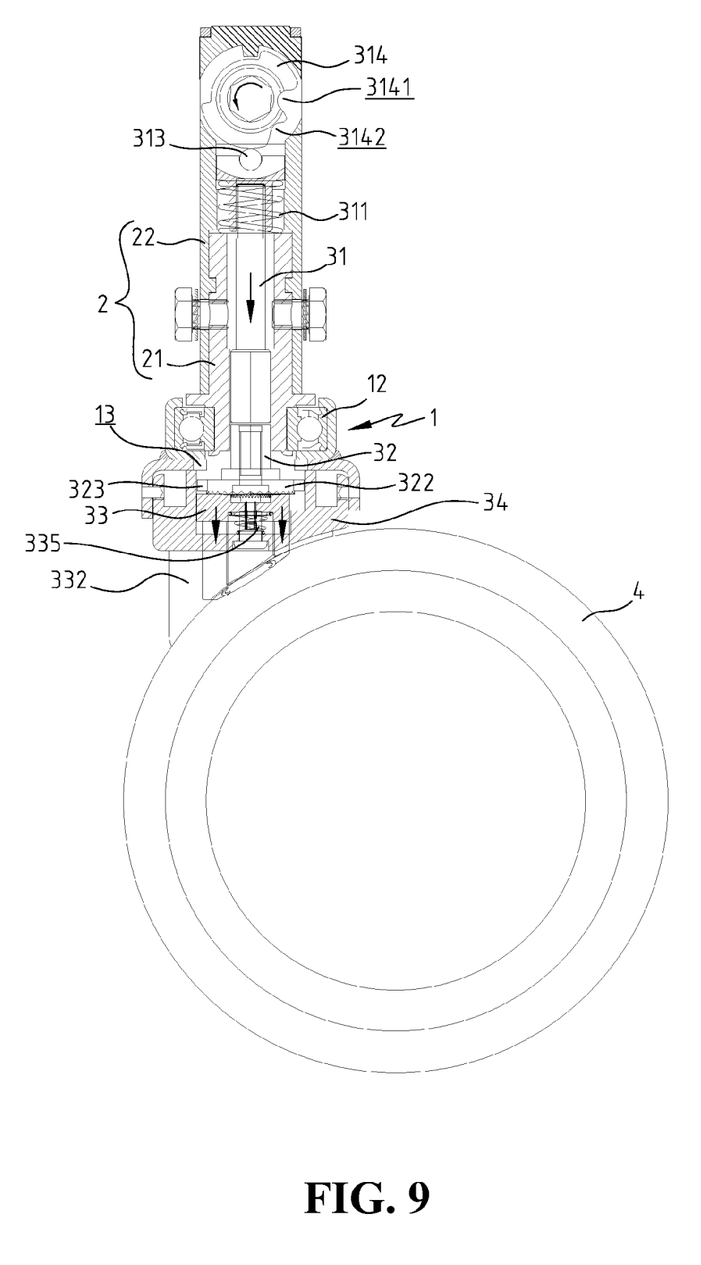
FIG. 9 is a cross sectional view showing the wheel and the cart braking device according to the present invention in a rotation braking and direction locking state.

Referring to FIG. 9, the rotating disc 314 is rotated counterclockwise, and the rolling rod 313 is out of the first groove 3141 and the second groove 3142. The cap 312 and the central shaft 31 are pushed downward. The orientation gear 322 of the orientation member 32 can be engaged with the fixation gear 331 of the braking member 33 at any angle without changing the direction of the swivel unit 1 and the wheel 4. The braking member 33, the base 34, the swivel unit 1 and the wheel 4 are fixed by the orientation gear 322 and are prevented from being rotated. The direction of the wheel 4 is locked. At the mean time, the orientation member 32 pushes the braking member 33 downward to compress the elastic member 335. The curved surfaces of the braking pads 332 are contacted with and tightly pressed against the shoulders of the wheel 4. Thus, the wheel 4 can not be rotated. The cart braking device according to the present invention has the functions of wheel braking and directional locking.

When making the wheel 4 to freely rotate and change direction, the rotating disc 314 is rotated clockwise to make the rolling rod 313 to be engaged in the second groove 3142 of the rotating disc 314 as shown in FIG. 7. Thus, the wheel braking and directional locking are relieved. The wheel 4 can freely rotate and change direction.

The tread surface of the wheel 4 at a circumferential center line is the place where the wheel 4 is contacted with the floor. After a period of use of the wheel 4, the tread surface at the circumferential center line show signs of wear. The braking pads 332 of the cart braking device according to the present invention can still tightly press against the shoulders of the wheel 4 to stop the rotation thereof. Thus, the cart braking device solves the problem that the conventional cart braking device can not function properly after the wheel 4 wears. When the cart braking device causes the uneven wear on the shoulders of the wheels 4, the tread surface at the circumferential center line is still smooth. Therefore, the cart braking device according to the present invention solves the cart bumping problem. The cart braking device according to the present invention uses crown-gear to crown-gear engagement to lock the wheel at any direction.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A cart braking device, comprising
   a swivel unit having a wheel frame pivotally connected with a wheel;
   a shaft unit mounted on the swivel unit, a bearing mounted between the shaft unit and the swivel unit making the swivel unit capable of rotating relative to the shaft unit; and
   a braking unit disposed inside of the swivel unit and the shaft unit, and comprising a central shaft, an orientation member, a braking member, and a base;
   wherein a top portion of the orientation member is coupled with the central shaft and a bottom portion of the orientation member has an orientation gear, the central shaft is provided with an elastic piece capable of moving the central shaft upward, a top surface of the braking member has a fixation gear corresponding to the orientation gear and a bottom portion of the braking member has two braking pads, the braking member is disposed inside the base and the braking pads are projected out of a bottom portion of the base, an elastic member is disposed between the braking member and the base and is capable of pushing the braking member away from the base, the base has two pad through-holes for allowing the braking pads to pass through, and the base is assembled in the swivel unit.

2. The cart braking device as claimed in claim 1, wherein a cap is mounted at a top of the central shaft, and the elastic piece is pressed against a bottom of the cap.

3. The cart braking device as claimed in claim 1, wherein the braking pads comprise curved surfaces whose curvatures are corresponding to those of shoulders of the wheel.

4. The cart braking device as claimed in claim 3, wherein the curved surfaces of the braking pads are not smooth surfaces.

5. The cart braking device as claimed in claim 3, wherein the curved surfaces of the braking pads comprise ridges.

6. The cart braking device as claimed in claim 3, wherein the curved surfaces of the braking pads comprise raised dots.

7. The cart braking device as claimed in claim 3, wherein the curved surfaces of the braking pads comprise grooves.

8. The cart braking device as claimed in claim 3, wherein the curved surfaces of the braking pads comprise recessed dots.

* * * * *